United States Patent [19]

Apps

[11] 3,906,370

[45] Sept. 16, 1975

[54] RADIO BEACON ENCLOSURE

[75] Inventor: David John Apps, Raleigh, N.C.

[73] Assignee: International Telephone and Telegraph Corporation, Nutley, N.J.

[22] Filed: Aug. 28, 1974

[21] Appl. No.: 501,129

[52] U.S. Cl. ................ 325/114; 325/116; 220/261; 206/523

[51] Int. Cl.$^2$ .......................................... H04B 1/034

[58] Field of Search .................... 325/119, 114–116, 325/111, 102; 220/261 X, 17; 206/523 X; 340/52 H, 224; 102/34.4, 35.6, 37.6

[56] References Cited

UNITED STATES PATENTS

| | | | |
|---|---|---|---|
| 2,473,050 | 6/1949 | Camp | 325/114 |
| 2,831,967 | 4/1958 | Bayze | 325/112 |
| 3,435,946 | 4/1969 | Sobek et al. | 206/523 |
| 3,829,781 | 8/1974 | Letson et al. | 325/115 |

FOREIGN PATENTS OR APPLICATIONS

| | | | |
|---|---|---|---|
| 828,896 | 2/1960 | United Kingdom | 325/114 |

*Primary Examiner*—George H. Libman
*Attorney, Agent, or Firm*—John T. O'Halloran; Menotti J. Lombardi, Jr.; Alfred C. Hill

[57] ABSTRACT

An enclosure for storing and protecting an automatic International Distress Signal radiating radio beacon on the deck of a ship is designed to be released from the ship automatically should the ship sink or capsize. Once released from the ship, the enclosure will float and will automatically eject the radio beacon contained inside into the water. The radio beacon is of the type designed to automatically transmit the International Distress Signal once in the water. The enclosure is constructed so that it provides an electrically sealed enclosure so that the beacon may be tested without removal from the enclosure and without producing external radiation of the International Distress Signal that could cause those receiving it to think there is an emergency when in reality there is no emergency. To facilitate testing the radio beacon, the enclosure includes an internal means to indicate the relative electrical field strength generated by the radio beacon and a test switch to activate the radio beacon. This testing of the radio beacon can be done while the enclosure is sealed and in its normal rest position on the deck of a ship.

12 Claims, 2 Drawing Figures

RADIO BEACON ENCLOSURE

BACKGROUND OF THE INVENTION

This invention relates to automatically actuated International Distress Signal radio beacons and more particularly to an enclosure for such radio beacons.

SUMMARY OF THE INVENTION

An object of the present invention is to provide an enclosure for an International Distress Signal radiating radio beacon which automatically ejects the radio beacon when a ship sinks or capsizes.

Another object of the present invention is to provide an enclosure for an International Distress Signal radiating radio beacon which protects the radio beacon and automatically ejects the radio beacon in case of an emergency and also allows the radio beacon to be tested within the enclosure when in its rest position on the deck of a ship.

A further object of the present invention is to provide an enclosure for an International Distress Signal radiating radio beacon which is automatically released from a sinking ship, which automatically ejects the enclosed radio beacon and allows the radio beacon to be tested within the enclosure when in its rest position on the deck of a ship.

A feature of the present invention is the provision of a radio beacon enclosure capable of automatically ejecting a radio beacon to enable the radio beacon to float free in water comprising: a metallic tubular housing having a longitudinal axis; a rupturable wall disposed transverse to the axis to close one end of the housing; a second wall disposed transverse to the axis sealed to the other end of the housing; a plastic cylinder disposed within the housing coaxial of the axis adjacent the one end of the housing, the outer surface of the cylinder being in a slideable relation with the inner surface of the housing, the cylinder being separable into two longitudinal half sections, each of the half sections having cooperating cavities coaxial of the axis to house the radio beacon; a pressurized gas vessel disposed in the housing between an end of the cylinder adjacent the other end of the housing and the second wall; a normally closed valve coupled to the vessel; and a lever connected to the valve and extending through the second wall in a sealed relation thereto; the rupturable wall having pressure applied thereto by the pressurized gas and the cylinder having pressure applied to the end of the cylinder adjacent the other end of the housing by the pressurized gas when the lever is actuated and the valve is opened, the pressure rupturing the rupturable wall and ejecting the cylinder from the housing through the ruptured rupturable wall to enable the cylinder to separate into its half sections thereby freeing the radio beacon from the cavities to enable the radio beacon to float free in the water.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
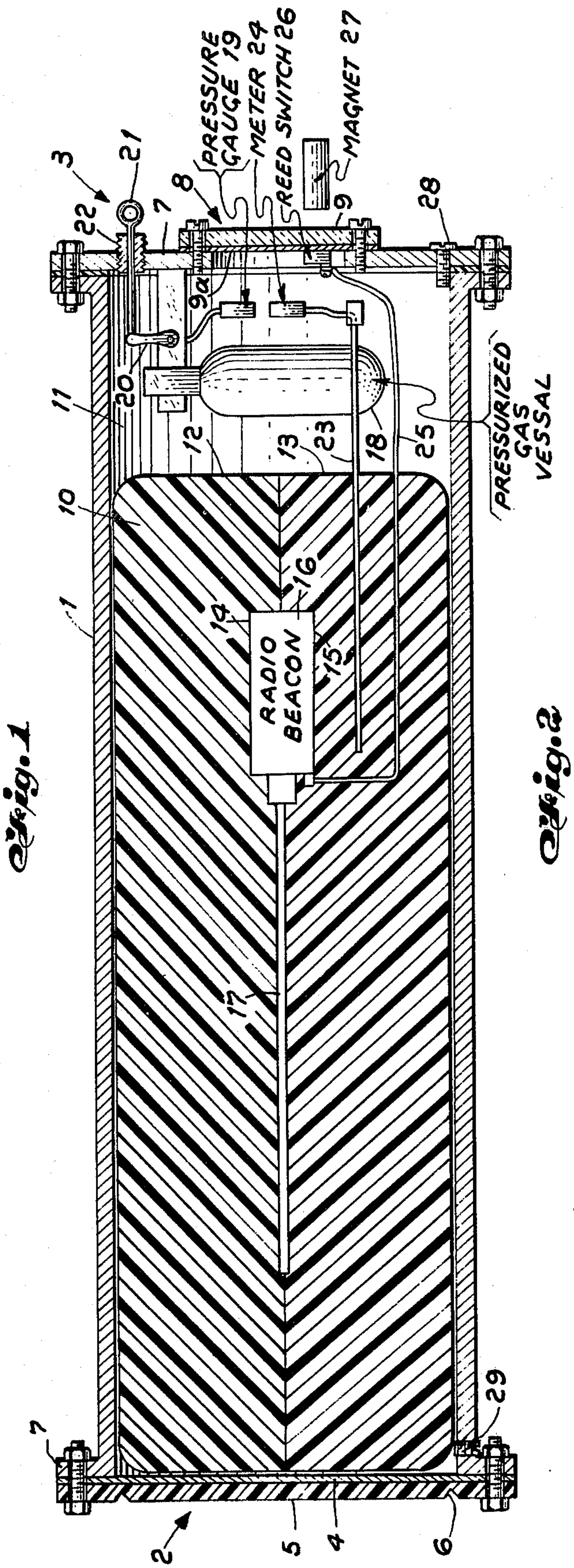
FIG. 1 is a longitudinal cross-sectional view of a radio beacon enclosure in accordance with the principles of the present invention.
Figure 2:
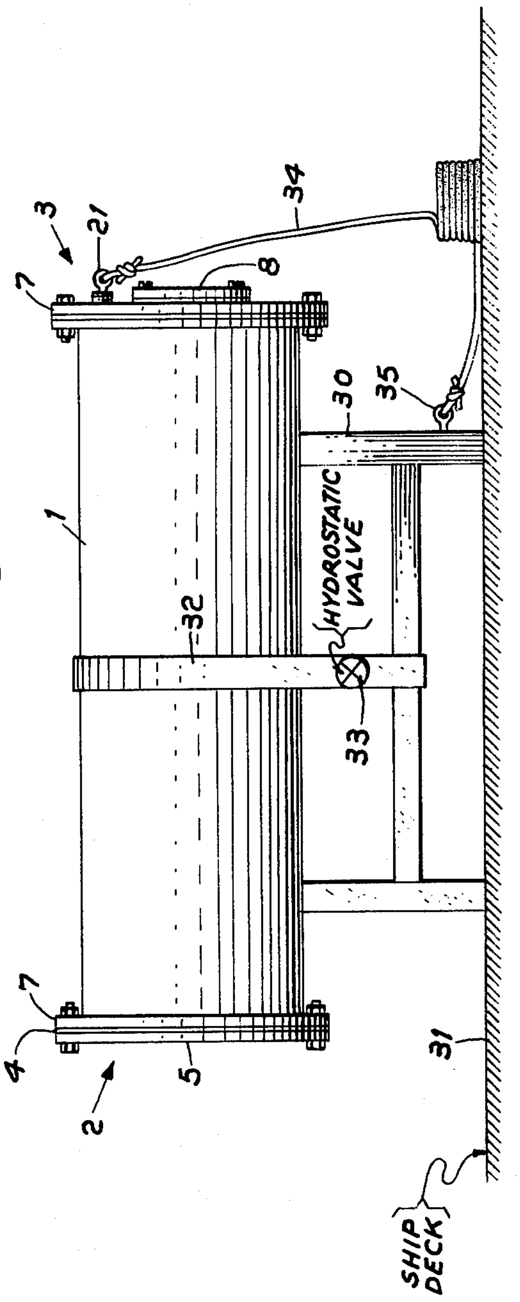
FIG. 2 is an elevational view of the enclosure of FIG. 1 in its rest position secured to the deck of a ship, the enclosure being automatically released when the ship sinks or capsizes.

Referring to FIGS. 1 and 2, the enclosure of the present invention includes a metallic tubular housing 1 with one end thereof sealed by a rupturable wall 2 and with the other end of housing 1 sealed by a second wall 3. Rupturable wall 2 includes a metallic membrane 4 and a plastic disc 5. Annular groove 6 cut in disc 5 weakens the disc to pressure from inside housing 1 but the flange 7 on the adjacent end of housing 1 supports disc 5 against external pressure. Wall 3 includes an annular disc 7 having a central opening thereof closed and sealed by a window 8 including transparent plastic material 9 whose inner surface is coated with a transparent metal film 9*a*. Window 8 permits visual inspecting of various components contained within housing 1 which will be discussed below. The purpose of metal membrane 4 and metallic film 9*a* in conjunction with disc 7 and housing 1 is to contain radiation from the radio beacon within the enclosure when tested. The testing of the radio beacon will be discussed below.

Within housing 1 is a plastic cylinder 10 composed of a light, buoyant, rigid plastic foam material. Cylinder 10 has an external diameter almost equal to the internal diameter of housing 1 and occupies much of its length but leaving cavity 11 adjacent wall 3. Cylinder 10 is in a slideable relation with the inner surface of housing 1 and is separable into two longitudinal half sections 12 and 13 with each of the half sections having cooperating cavities 14 and 15 to house radio beacon 16 with its antenna 17 and a built-in battery. The reason for splitting cylinder 10 into two half sections 12 and 13 is to allow radio beacon 16 and its associated antenna 17 to be placed inside cylinder 10 prior to insertion in housing 1.

Within cavity 11 of housing 1 attached to disc 7 is a sealed vessel 18 containing a pressurized gas such as $CO_2$. A pressure gauge 19 visible through window 8 indicates the pressure which can be released when required by valve 20. Valve 20 can be externally operated by lever 21 which passes through a seal 22 in disc 7.

Pushed into the material of cylinder 10 is a metal antenna rod 23 connected to an electrical field strength meter 24 which is visible through window 8. Meter 24 indicates the relative electrical field strength generated by beacon 16 when actuated for test purposes. Thin wires 25 are connected between beacon 16 and reed switch 26 secured to the internal surface of film 9*a*. For test purposes a magnet 27 placed outside the window will activate switch 26 which in turn activates beacon 16 for testing purposes. A device 28 enables removal of internal moisture. During installation or removal of cylinder 10, it is not necessary to disturb rupturable wall 2 since cylinder 10 can be inserted through the end of housing 1 sealed by wall 3. A removable plug 29 releases trapped air during this installation operation.

Housing 1 and its contents are layed in cradle 30 secured to the ship deck 31 with housing 1 being secured to cradle 30 by a metal band 32 including as an integral part thereof hydrostatic valve 33. Should the ship sink, the water pressure on valve 33 releases band 32 and housing 1 and its contents float free in the water as much as permitted by tether line 34 which is connected between lever 21 and anchor member 35. The enclosure will float free in the water until tether line 34 pulls tight and actuates lever 21. Pressurized gas is then released from vessel 18, which generates internal pressure in housing 1 and ruptures disc 5. Cylinder 10 ruptures membrane 4 and is ejected from housing 1 by virtue of the fact that cylinder 10 forms a piston upon which the expending gas from vessel 18 exerts pressure. Finally, cylinder 10 separates into its two halfs after ejection and beacon 16 and its associated antenna 17 floats free and is automatically actuated by the water.

While I have described above the principles of my invention in connection with specific apparatus it is to be clearly understood that this description is made only by way of example and not as a limitation to the scope of my invention as set forth in the objects thereof an in the accompanying claims.

I claim:

1. A radio beacon enclosure capable of automatically ejecting a radio beacon to enable said radio beacon to float free in water comprising:

a metallic tubular housing having a longitudinal axis;

a rupturable wall disposed transverse to said axis to close one end of said housing;

a second wall disposed transverse to said axis sealed to the other end of said housing;

a plastic cylinder disposed within said housing coaxial of said axis adjacent said one end of said housing, the outer surface of said cylinder being in a slideable relation with the inner surface of said housing, said cylinder being separable into two longitudinal half sections, each of said half sections having cooperating cavities coaxial of said axis to house said radio beacon;

a pressurized gas vessel disposed in said housing between an end of said cylinder adjacent said other end of said housing and said second wall;

a normally closed valve coupled to said vessel; and a lever connected to said valve and extending through said second wall in a sealed relation thereto;

said rupturable wall having pressure applied thereto by said pressurized gas and said cylinder having pressure applied to said end of said cylinder adjacent said other end of said housing by said pressurized gas when said lever is actuated and said valve is opened, said pressure rupturing said rupturable wall and ejecting said cylinder from said housing through said ruptured rupturable wall to enable said cylinder to separate into its two half sections thereby freeing said radio beacon from said cavities to enable said radio beacon to float free in said water.

2. An enclosure according to claim 1, further including a cradle secured to a deck of a ship;

a metal band to secure said housing and its contents of said cradle, said metal band including as an integral part thereof a water pressure responsive device to release said metal band and hence said housing and its contents from said cradle upon exceeding a given water pressure and;

a tether line anchored to said cradle and connected to said lever to actuate said lever when said tether line pulls tight.

3. An enclosure according to claim 1, wherein said second wall includes an annular disc having an opening therein, and a window disposed over said disc opening in a sealed relation therewith.

4. An enclosure according to claim 3, further including a pressure gauge disposed within said housing, connected to said vessel and disposed relative to said window to enable said pressure gauge to be observed externally of said housing.

5. An enclosure according to claim 4, further including an antenna rod disposed in said cylinder adjacent said radio beacon;

an electrical field strength meter disposed within said housing, connected to said antenna rod and disposed relative to said window to enable said meter to be observed externally of said housing; and a circuit including a switch disposed within said housing and connected to said radio beacon, said switch being disposed relative to said window to enable said switch to be activated externally of said housing to test said radio beacon while enclosed in said housing and said cylinder.

6. An enclosure according to claim 5, wherein said switch is a reed switch, and said reed switch is activated by a magnet disposed externally of said housing adjacent said window.

7. An enclosure according to claim 6, wherein said rupturable wall includes a plastic rupturable disc, and a metallic membrane; and said window includes a transparent metal film deposited on the inner surface of said window;

said housing, said annular disc, said metal film and said metallic membrane cooperating to contain radiation from said radio beacon within said enclosure when said radio beacon is tested.

8. An enclosure according to claim 7, further including a cradle secured to a deck of a ship;

a metal band to secure said housing and its contents to said cradle, said metal band including as an integral part thereof a water pressure responsive device to release said metal band and hence said housing and its contents from said cradle upon exceeding a given water pressure and;

a tether line anchored to said cradle and connected to said lever to actuate said lever when said tether line pulls tight.

9. An enclosure according to claim 1, wherein said second wall includes an annular disc having an opening therein, and a window disposed over said disc opening in a sealed relation therewith; and further including an antenna rod disposed in said cylinder adjacent said radio beacon;

an electrical field strength meter disposed within said housing, connected to said antenna rod and disposed relative to said window to enable said meter to be observed externally of said housing; and a circuit including a switch disposed within said housing and connected to said radio beacon, said switch being disposed relative to said window to enable said switch to be activated externally of said housing to test said radio beacon while enclosed in said housing and said cylinder.

10. An enclosure according to claim 9, wherein said switch is a reed switch, and said reed switch is activated by a magnet disposed externally of said housing adjacent said window.

11. An enclosure according to claim 10, wherein said rupturable wall includes a plastic rupturable disc, and a metallic membrane; and said window includes a transparent metal film deposited on the inner surface of said window;

said housing, said annular disc, said metal film and said metallic membrane cooperating to contain radiation from said radio beacon within said enclosure when said radio beacon is tested.

12. An enclosure according to claim 11, further including a cradle secured to a deck of a ship;

a metal band to secure said housing and its contents to said cradle, said metal band including as an integral part thereof a water pressure responsive device to release said metal band and hence said housing and its contents from said cradle upon exceeding a given water pressure and;

a tether line anchored to said cradle and connected to said lever to actuate said lever when said tether line pulls tight.

* * * * *